United States Patent
Ikebukuro (10) Patent No.: US 10,028,494 B2
(45) Date of Patent: Jul. 24, 2018

(54) SPINNING REEL ROTOR AND SPINNING REEL

(71) Applicant: Shimano Inc., Sakai, Osaka (JP)

(72) Inventor: Satoshi Ikebukuro, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 106 days.

(21) Appl. No.: 15/170,541

(22) Filed: Jun. 1, 2016

(65) Prior Publication Data

US 2017/0164592 A1 Jun. 15, 2017

(30) Foreign Application Priority Data

Dec. 14, 2015 (JP) ................................ 2015-243200

(51) Int. Cl.
*A01K 89/01* (2006.01)

(52) U.S. Cl.
CPC ............................... *A01K 89/0108* (2013.01)

(58) Field of Classification Search
CPC ..................................................... A01K 89/01
See application file for complete search history.

(56) References Cited

U.S. PATENT DOCUMENTS

| | | | | |
|---|---|---|---|---|
| 4,463,915 A * | 8/1984 | Kaneko | ................... | A01K 89/01 242/232 |
| 6,082,649 A * | 7/2000 | Smith | .................... | A01K 89/01 242/233 |
| 6,457,662 B1 * | 10/2002 | Sato | ........................ | A01K 89/01 242/247 |
| 2002/0088889 A1 * | 7/2002 | Morise | ............... | A01K 89/0111 242/322 |
| 2003/0146325 A1 * | 8/2003 | Kitajima | ................ | A01K 89/01 242/311 |
| 2003/0197081 A1 * | 10/2003 | Chin | ....................... | A01K 89/01 242/242 |
| 2004/0206840 A1 * | 10/2004 | Kitajima | ................ | A01K 89/01 242/306 |
| 2009/0072066 A1 * | 3/2009 | Saito | ...................... | A01K 89/01 242/273 |

(Continued)

FOREIGN PATENT DOCUMENTS

EP          2248418 A1    11/2010
JP      2012016355 A     1/2012

(Continued)

OTHER PUBLICATIONS

Extended European Search Report dated May 18, 2017 for corresponding EP Application No. 16192724.9, 12 pp.

*Primary Examiner* — Emmanuel M Marcelo
(74) *Attorney, Agent, or Firm* — United IP Counselors, LLC (57) ABSTRACT

A rotor for a spinning reel is configured to rotate about a spool shaft, and includes a tubular portion and a plate-shaped portion. The tubular portion is disposed away from the spool shaft at a predetermined interval. The plate-shaped portion includes a radially outer part and a radially inner part. The radially outer part is integrated with an inner peripheral part of the tubular portion. The radially inner part extends from the radially outer part toward the spool shaft. The radially outer part has a smaller thickness than at least a part of the radially inner part.

15 Claims, 5 Drawing Sheets

(56) References Cited

U.S. PATENT DOCUMENTS

2014/0231569 A1* 8/2014 Hui .................... A01K 89/0111
                                                              242/234
2014/0346266 A1* 11/2014 Matsuo .................. A01K 89/01
                                                              242/234

FOREIGN PATENT DOCUMENTS

JP         2012024028 A      2/2012
JP         2013202006 A     10/2013

* cited by examiner

SPINNING REEL ROTOR AND SPINNING REEL

CROSS-REFERENCE TO RELATED APPLICATIONS

This application claims priority to Japanese Patent Application No. 2015-243200 filed on Dec. 14, 2015, the entirety of which is hereby incorporated by reference in its entirety.

BACKGROUND

Technical Field

The present disclosure relates to a rotor for a spinning reel, and particularly to a spinning reel rotor that rotates about a spool shaft. Additionally, the present disclosure relates to a spinning reel, particularly to a spinning reel including the aforementioned rotor.

Background Information

A well-known rotor for a spinning reel rotates about a spool shaft (see e.g., Japan Laid-open Patent Application Publication No. 2013-202006). The spinning reel rotor includes a tubular portion, a pair of rotor arms and a plate-shaped portion. The tubular part is disposed away from the spool shaft at a predetermined interval. One end of each of the rotor arms is integrated with the outer peripheral part of the tubular portion. The tip of one of the rotor arms is provided with a line roller for guiding a fishing line. The plate-shaped portion is a portion extending from a radially outer part of the plate-shaped portion toward the spool shaft. The plate-shaped portion is integrated with the inner peripheral part of the tubular portion, and a thickness of the plate-shaped portion is substantially constant.

In the well-known spinning reel rotor, the tension of the fishing line is transmitted to the aforementioned one of the rotor arms through the line roller. In response, stress against the tension of the fishing line is transmitted to the tubular portion through the aforementioned one of the rotor arms. Therefore, chances of a deformation of the tubular portion become higher with an increase in the magnitude of the aforementioned stress.

Various attempts have been tried so far for inhibiting a deformation of the tubular portion. A stiffness of the tubular portion depends on the stiffness of the plate-shaped portion. For example, when the plate-shaped portion is enhanced in stiffness by increasing a thickness of the plate-shaped portion, a deformation of the tubular portion can be inhibited. In this case, with an increase in a thickness of the plate-shaped portion, chances of producing a sink mark become higher on a region of the outer peripheral part of the tubular portion that is located radially outward of a region at which the outer peripheral part of the plate-shaped portion is connected to the inner peripheral part of the tubular portion. Additionally, when the sink mark is produced, a recess is formed on the region at which the tubular portion and the plate-shaped portion are connected. Hence, there are also chances of causing a concentration of stress on the recess. Moreover, there are also chances of an increase in a weight of the rotor.

BRIEF SUMMARY

The present disclosure has been produced in view of the aforementioned drawbacks. It is an object of the present disclosure to enhance the aesthetic appearance of a rotor, and simultaneously, to reduce a concentration of stress on the rotor. Additionally, it is another object of the present disclosure to produce the rotor with a lightweight construction (1) A rotor for a spinning reel according to an aspect of the present disclosure is configured to rotate about a spool shaft. The present rotor preferably includes a tubular portion and a plate-shaped portion. The tubular portion is disposed away from the spool shaft at a predetermined interval. The plate-shaped portion includes a radially outer part and a radially inner part. The radially outer part is integrated with an inner peripheral part of the tubular portion. The radially inner part extends from the radially outer part toward the spool shaft. The radially outer part has a smaller thickness than at least a part of the radially inner part.

In the present rotor, the radially outer part of the plate-shaped portion preferably has a smaller thickness than at least a part of the radially inner part of the plate-shaped portion. With that construction, a formation of a sink mark can be prevented on a region at which the radially outer part of the plate-shaped portion is connected to the inner peripheral part of the tubular portion. Additionally, preventing a formation of a sink mark can prevent a concentration of stress on the region at which the radially outer part of the plate-shaped portion is connected to the inner peripheral part of the tubular portion. In other words, an aesthetic appearance of the rotor can be enhanced, and simultaneously, a concentration of stress on the rotor can be reduced. Moreover, the rotor can be produced with a lightweight construction.

It should be noted that in the present rotor, the radially outer part of the plate-shaped portion has a smaller thickness than at least a part of the radially inner part of the plate-shaped portion. In other words, at least a part of the radially inner part of the plate-shaped portion has a larger thickness than the radially outer part of the plate-shaped portion. Accordingly, a stiffness required for the radially inner part of the plate-shaped portion, i.e., a stiffness required for the rotor can be reliably achieved, and simultaneously, the aforementioned advantageous effects can be achieved.

(2) In a rotor for a spinning reel according to another aspect of the present disclosure, the radially inner part tapers such that a thickness thereof gradually reduces radially outward. With that construction, the radially inner part and the radially outer part of the plate-shaped portion can be smoothly connected. In other words, a stiffness required for the plate-shaped portion can be reliably achieved, and simultaneously, a concentration of stress that causes a deformation of the plate-shaped portion can be avoided.

(3) In a rotor for a spinning reel according to yet another aspect of the present disclosure, the radially outer part includes a first annular plate part. The radially inner part includes a second annular plate part and a protruding part. The second annular plate part is integrated with an inner peripheral part of the first annular plate part. The protruding part axially protrudes from the second annular plate part. Even with that construction, advantageous effects similar to those described above can be achieved.

(4) In a rotor for a spinning reel according to yet another aspect of the present disclosure, the protruding part is made in a truncated shape. With this construction, the radially inner part and the radially outer part can be smoothly connected. In other words, a stiffness required for the plate-shaped portion can be reliably achieved, and simultaneously, a concentration of stress that causes a deformation of the plate-shaped portion can be avoided.

(5) In a rotor for a spinning reel according to yet another aspect of the present disclosure, the plate-shaped portion includes a rib part. The rib part extends from the radially inner part to the radially outer part. With that construction, an increase in a weight of the plate-shaped portion can be inhibited, and simultaneously, a stiffness of the plate-shaped portion can be enhanced.

(6) A rotor for a spinning reel according to yet another aspect of the present disclosure further includes an arm member on an outer peripheral part of the tubular portion. The rib part can be on the radially inner part and the radially outer part and between the spool shaft and the arm member.

In this case, the rib part is on the radially inner part and the radially outer part and between the spool shaft and the arm member. In other words, the rib part is on a region of the plate-shaped portion to which a large magnitude of stress is applied from the arm member through the tubular portion. Hence, a stiffness of the plate-shaped portion can be effectively enhanced.

(7) In a rotor for a spinning reel according to yet another aspect of the present disclosure, the rib part does not contact the tubular portion. For example, in this case, a gap is produced between the outer peripheral part of the rib part and the inner peripheral part of the tubular portion. Hence, a stiffness of the plate-shaped portion can be effectively enhanced without forming a sink mark.

(8) A spinning reel, according to yet another aspect of the present disclosure, includes a spool shaft and the aforementioned rotor configured to rotate about the spool shaft. With that construction, the spinning reel can also achieve advantageous effects similar to those described above.

Overall, according to the present disclosure, the aesthetic appearance of the rotor can be enhanced, and a concentration of stress on the rotor can be reduced. Additionally, according to the present disclosure, the rotor can be produced with a lightweight construction.

BRIEF DESCRIPTION OF THE DRAWINGS

Referring now to the attached drawings which form a part of this original disclosure.

DETAILED DESCRIPTION OF EMBODIMENTS

Figure 1:
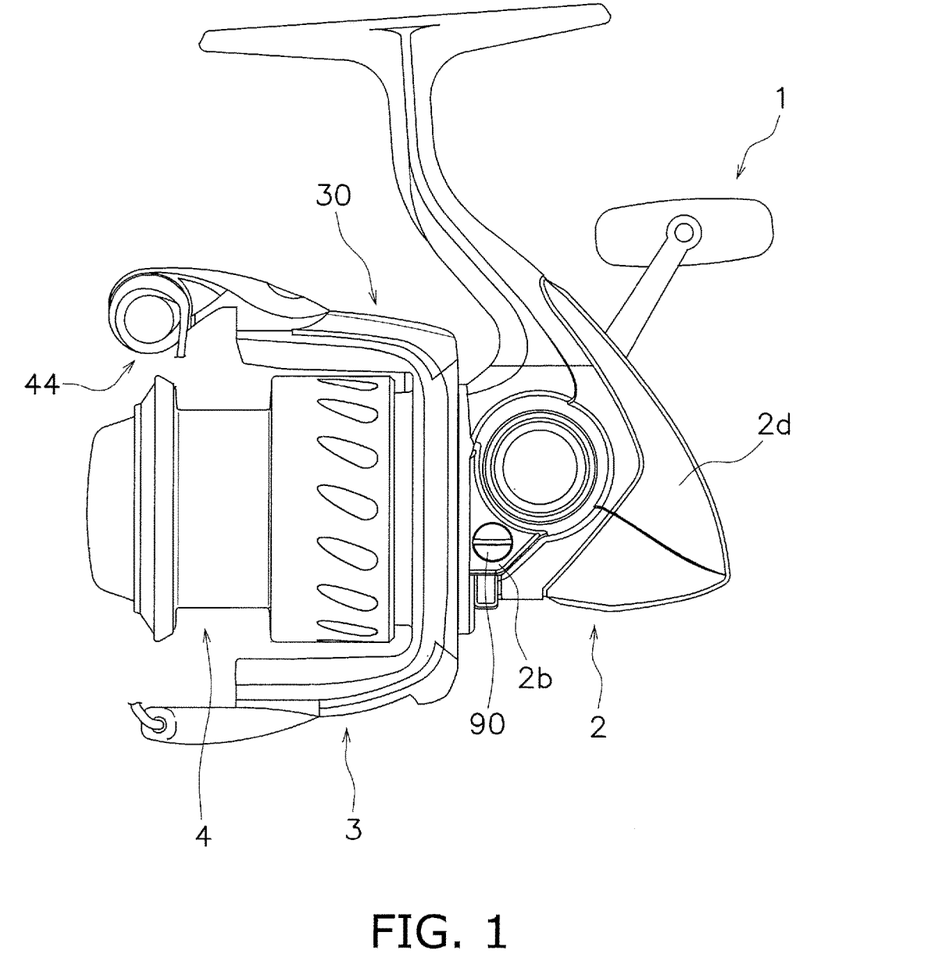
FIG. 1 is a side view of a spinning reel according to a preferred embodiment of the present disclosure.
Figure 2:
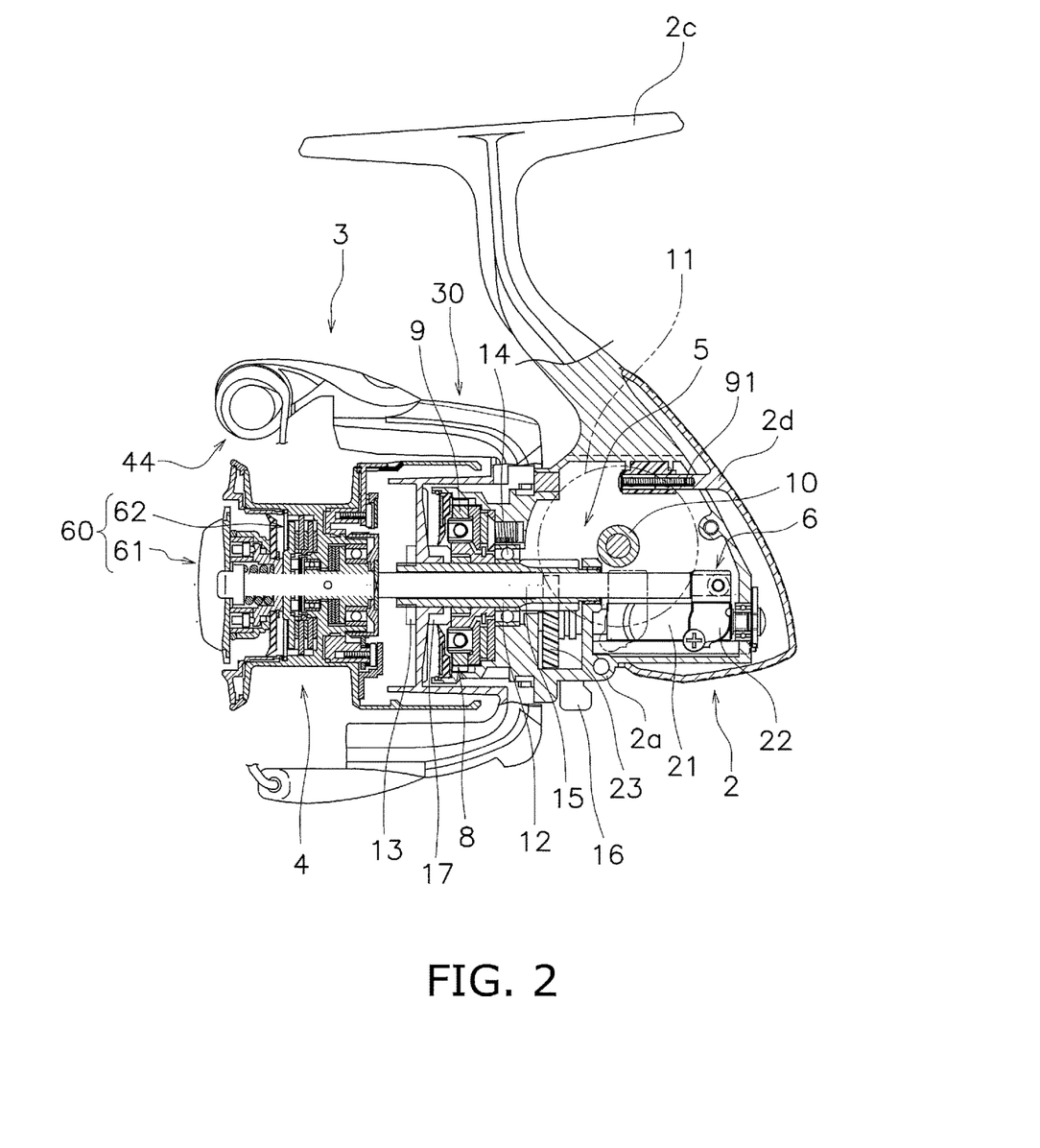
FIG. 2 is a cross-sectional side view of the spinning reel.

FIGS. 1 and 2 show a spinning reel employing a preferred embodiment of the present disclosure.

An extending direction of a spool shaft 15 will be hereinafter referred to as an "axial direction". The term "axial direction" encompasses directions arranged along the spool shaft 15. It should be noted that when indicating a direction in which a fishing line is reeled out, the "axial direction" will be referred to as a "forward (front) direction" on an as-needed basis. On the other hand, when indicating the opposite direction to a "forward (front) direction", the "axial direction" will be referred to as a "rearward (rear) direction" on an as-needed basis.

Additionally, a direction separating from the spool shaft 15 will be herein referred to as a "radial direction". When herein indicating a direction approaching to a fishing rod (not shown in the drawing) from the spool shaft 15 in a condition that a reel unit 2 is mounted to the fishing rod, the "radial direction" will be referred to as an "upward (up) direction" on an as-needed basis. On the other hand, when indicating a direction separating from the fishing rod in the condition that the reel unit 2 is mounted to the fishing rod, the "radial direction" will be herein referred to as a "downward (down) direction" on an as-needed basis.

It should be noted that in FIG. 1, a "forward (front) direction" corresponds to the left direction on the drawing, whereas a "rearward (rear) direction" corresponds to the right direction on the drawing. Additionally, in FIG. 1, an "upward (up) direction" corresponds to the upward direction on the drawing, whereas a "downward (down) direction" corresponds to the downward direction on the drawing.

Moreover, an axis X (see FIG. 3) of the spool shaft 15 is matched with the rotational center of a rotor 3 and that of a pinion gear 12. In each member, a part located about the axis X will be referred to as a "center part" on an as-needed basis.

As shown in FIG. 1, the spinning reel includes a handle 1, the reel unit 2, a spool 4 and the rotor 3. The handle 1 is rotatably supported by the reel unit 2. The handle 1 is mountable to either the left side or the right side of the reel unit 2.

As shown in FIG. 2, the reel unit 2 includes a reel body 2a, a lid member 2b (see FIG. 1) and a body guard 2d.

The reel body 2a is made of a light metal alloy (e.g., magnesium alloy, aluminum alloy, etc.). A fishing rod attachment leg 2c is integrated with the upper part of the reel body 2a. The front part of the reel body 2a is disposed inside the rear part of the rotor 3. The spool shaft 15 is mounted to the reel body 2a while being movable in the back-and-forth direction. The reel body 2a includes an internal space. A rotor drive mechanism 5 (to be described), an oscillating mechanism 6 (to be described) and an anti-reverse mechanism 8 (to be described) are disposed in the internal space of the reel body 2a.

The lid member 2b is made of a light metal alloy (e.g., magnesium alloy, aluminum alloy, etc.). The lid member 2b is attached to the reel body 2a in order to close the internal space of the reel body 2a, and is detachable therefrom. Specifically, the lid member 2b is fixed to the reel body 2a by a fixation bolt (not shown in the drawings) at its front part invisibly disposed behind the rotor 3. Additionally, as shown in FIG. 1, the lid member 2b is fixed to the reel body 2a by a fixation bolt 90 at its part located rearward of the rotor 3.

As shown in FIGS. 1 and 2, the body guard 2d covers the rear part of the reel body 2a and that of the lid member 2b. As shown in FIG. 2, the body guard 2d is fixed to the reel body 2a by a fixation bolt 91 inserted therein from the inside of the reel body 2a.

As shown in FIG. 2, the rotor drive mechanism 5 includes a face gear 11 and the pinion gear 12. The face gear 11 is rotated together with a master gear shaft 10 to which the handle 1 is fixed. The pinion gear 12 is made in a tubular shape. The pinion gear 12 is a component through which the spool shaft 15 is inserted. The pinion gear 12 is meshed with the face gear 11. The pinion gear 12 is rotated in conjunction with a rotation of the face gear 11.

The front part of the pinion gear 12 penetrates through the center part of the rotor 3, and is fixed to the rotor 3 by a nut 13. The pinion gear 12 is rotatably supported by the reel unit 2 (the reel body 2a) through a bearing 14.

As shown in FIG. 2, the oscillating mechanism 6 is a mechanism that moves the spool 4 and the spool shaft 15 in the axial direction. The oscillating mechanism 6 includes a worm shaft 21, a slider 22 and an intermediate gear 23. The worm shaft 21 is disposed below and in parallel to the spool shaft 15, and is rotatably mounted to the reel body 2a.

The slider 22 is non-rotatably fixed to the rear end of the spool shaft 15. The slider 22 is engaged with the worm shaft 21. The slider 22 is moved together with the spool shaft 15 along the worm shaft 21 in the back-and-forth direction. The intermediate gear 23 is fixed to the tip of the worm shaft 21. The intermediate gear 23 is meshed with the pinion gear 12.

When the face gear 11 is herein rotated, the pinion gear 12 is rotated. Accordingly, the worm shaft 21 is rotated through the intermediate gear 23. Then, in conjunction with a rotation of the worm shaft 21, the slider 22 is moved together with the spool shaft 15 along the worm shaft 21 in the back-and-forth direction. The spool 4 coupled to the spool shaft 15 is thereby moved in the back-and-forth direction.

As shown in FIG. 2, the anti-reverse mechanism 8 is a mechanism that prevents or allows a reverse rotation of the rotor 3. The anti-reverse mechanism 8 is disposed in the front part of the reel unit 2 (e.g., the front part of the reel body 2a). The anti-reverse mechanism 8 includes a one-way clutch 9 and a switch mechanism 16. The switch mechanism 16 switches the one-way clutch 9 between an activation state (reverse rotation preventing state) and a deactivation state (reverse rotation allowing state).

As shown in FIGS. 1 and 2, the spool 4 is disposed forward of the rotor 3 while being movable in the axial direction, and winds the fishing line onto an outer peripheral surface of the spool 4. Additionally, the spool 4 is disposed between a first rotor arm 31 (to be described) and a second rotor arm 32 (to be described) of the rotor 3.

As shown in FIG. 2, a drag mechanism 60 is disposed in the inner peripheral part of the spool 4. The spool 4 is coupled to the spool shaft 15 through the drag mechanism 60. The spool shaft 15 is moved in the axial direction by the oscillating mechanism 6.

The drag mechanism 60 is herein configured to brake a rotation of the spool 4. The drag mechanism 60 includes a drag regulation knob 61 and a brake portion 62. The drag regulation knob 61 is screwed onto the tip of the spool shaft 15. When pressed by the drag regulating knob 61, the brake portion 62 brakes the spool 4.

Figure 3:
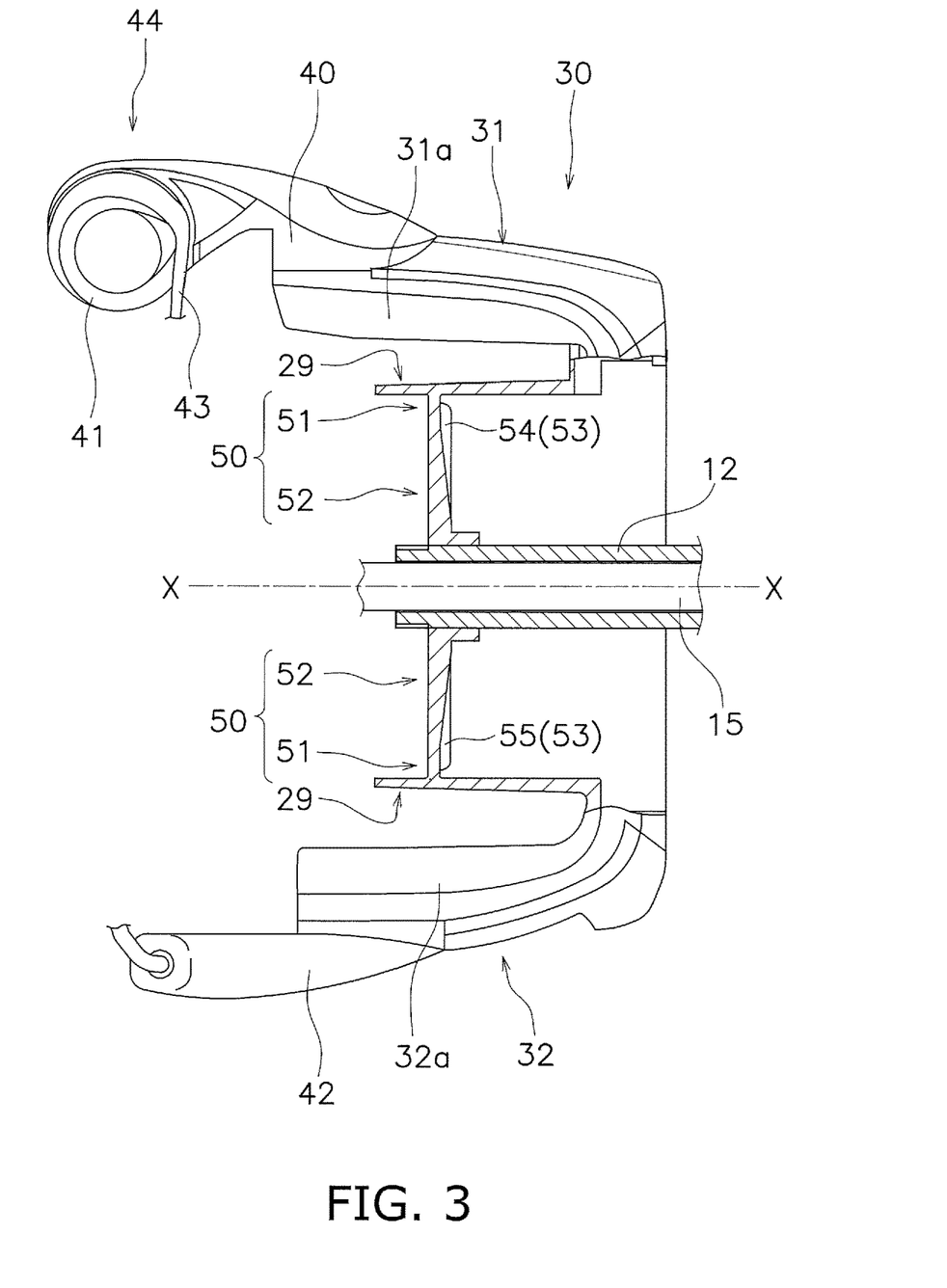
FIG. 3 is an enlarged cross-sectional view of a rotor in the spinning reel.

The rotor 3 is rotatably supported by the reel unit 2. Specifically, the rotor 3 is supported by the reel unit 2 while being rotatable about the spool shaft 15. As shown in FIGS. 1 to 3, the rotor 3 includes a rotor body 7, a rotor arm member 30 (e.g., exemplary arm member) and a bail arm 44.

As shown in FIG. 2, the rotor body 7 is rotatably supported at the front part of the reel unit 2. Additionally, the rotor body 7 is non-rotatably coupled to the front part of the pinion gear 12. Specifically, the rotor body 7 is engaged with the pinion gear 12 by anon-circular coupling, and is fixed to the pinion gear 12 by the nut 13. It should be noted that a positioning member 17 is disposed between the rotor body 7 and the bearing 14, in more detail, between the rotor body 7 and the anti-reverse mechanism 8.

Figure 4:
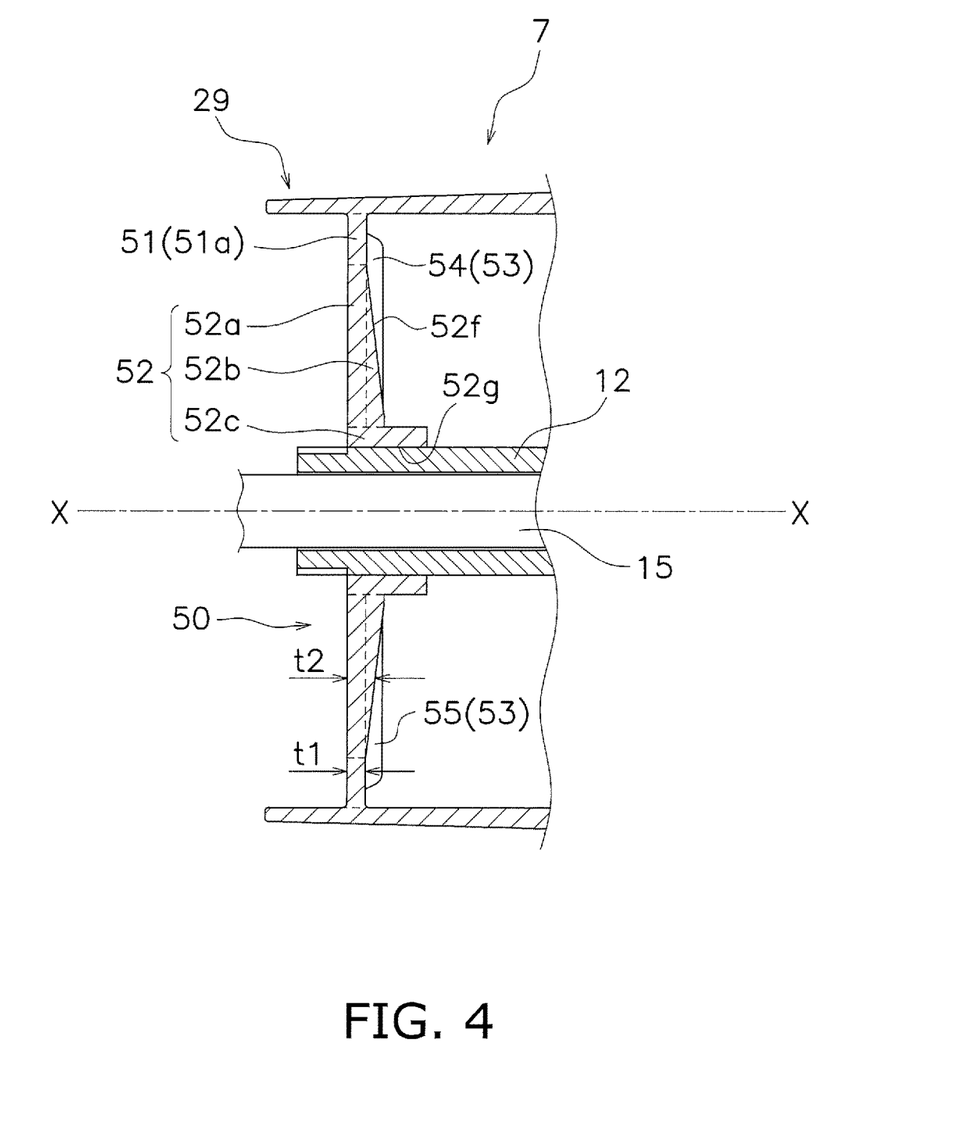
FIG. 4 is an enlarged cross-sectional view of a part of the rotor (tubular portion) in the spinning reel.
Figure 5:
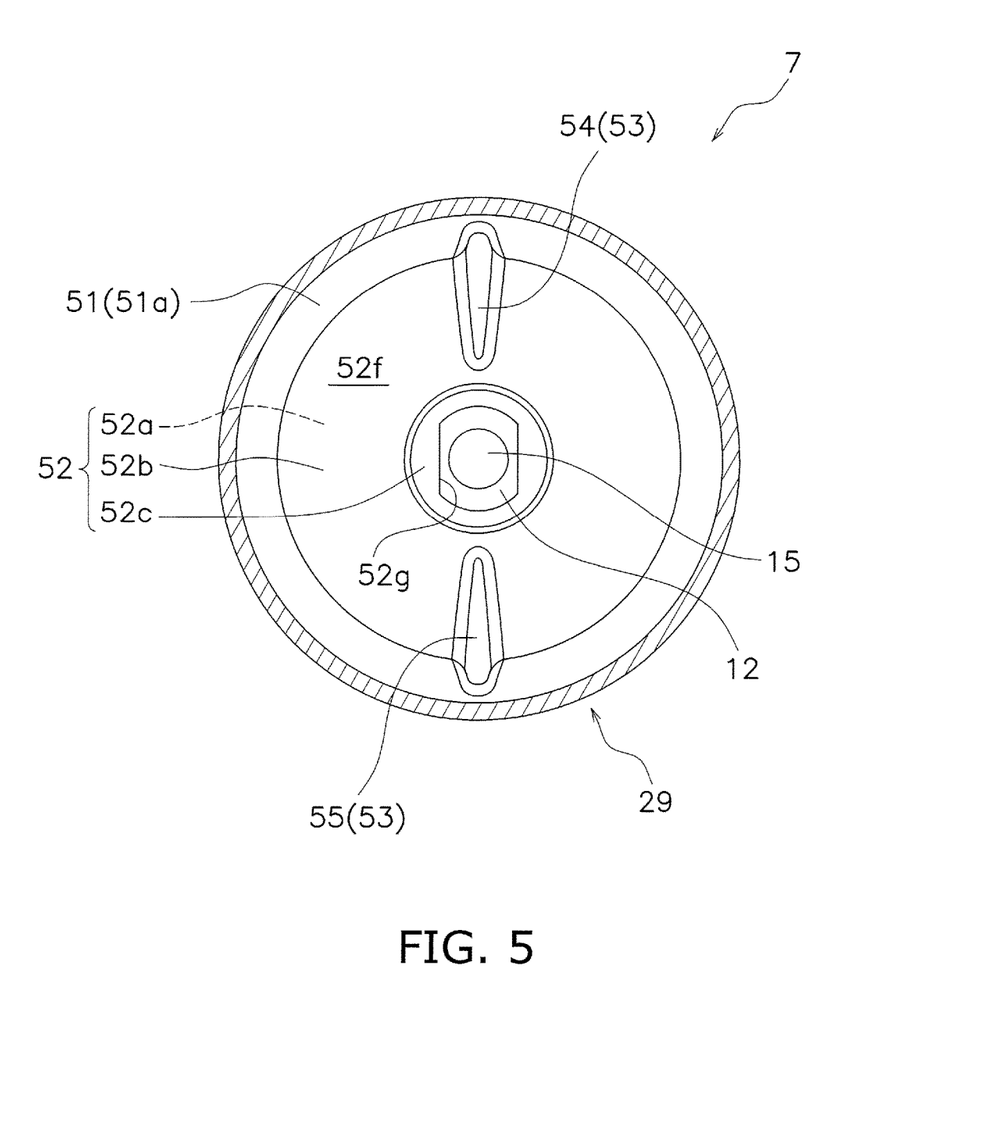
FIG. 5 is a cross-sectional rear view of a part of the rotor (tubular portion) in the spinning reel.

The rotor body 7 is made of, for instance, a synthetic resin. As shown in FIGS. 3 to 5, the rotor body 7 includes a tubular portion 29 and a wall portion 50 (e.g., exemplary plate-shaped portion). The tubular portion 29 is made in a substantially tubular shape. The tubular portion 29 is disposed away from the spool shaft 15 at a predetermined interval. When described in detail, the tubular portion 29 is disposed radially away from the spool shaft 15 at a predetermined interval. A large magnitude of stress is transmitted from the rotor arm member 30 through the tubular portion 29. Thus, the tubular portion 29 is an example of a stress transmitting means.

As shown in FIGS. 3 to 5, the wall portion 50 is integrated with the inner peripheral part of the tubular portion 29. As shown in FIGS. 4 and 5, the wall portion 50 includes a radially outer part 51, a radially inner part 52 and rib parts 53. The radially outer part 51 is a radially outer part of the wall portion 50 that is located about the spool shaft 15. The radially outer part 51 is integrated with the inner peripheral part of the tubular portion 29.

Specifically, the radially outer part 51 includes a first annular plate part 51a (e.g., exemplary first annular plate part). The first annular plate part 51a is made in a substantially annular plate shape. The outer peripheral part of the first annular plate part 51a is integrated with the inner peripheral part of the tubular portion 29. As shown in FIG. 4, the first annular plate part 51a has a smaller thickness than at least a part of the radially inner part 52. When described in detail, the first annular plate part 51a has an axial thickness t1 that is smaller than an axial thickness t2 of the radially inner part 52 (e.g., a second annular plate part 52a and a truncated conical part 52b).

As shown in FIG. 4, the radially inner part 52 is a part extending from the radially outer part 51 toward the spool shaft 15. The radially inner part 52 tapers such that the axial thickness t2 reduces radially outward. More specifically, the radially inner part 52 includes the second annular plate part 52a (e.g., exemplary second annular plate part), the truncated conical part 52b (e.g., exemplary protruding part) and a tubular mount part 52c. The second annular plate part 52a is made in a substantially annular shape. The second annular plate part 52a is integrated with the inner peripheral part of the first annular plate part 51a. The tubular mount part 52c is integrated with the inner peripheral part of the second annular plate part 52a.

As shown in FIGS. 4 and 5, the truncated conical part 52b is a part that is made in a substantially truncated conical shape and axially protrudes from the second annular plate part 52a. The truncated conical part 52b axially protrudes from the second annular plate part 52a, and the second annular plate part 52a serves as the bottom surface of the truncated conical part 52b. The truncated conical part 52b herein protrudes toward the rear part of the tubular portion 29.

When described in detail, the bottom surface of the truncated conical part 52b is integrated with one surface of the second annular plate part 52a. The lateral surface of the truncated conical part 52b radially tapers from a top surface of the truncated conical part 52b toward an outer peripheral part of the truncated conical part 52b. In other words, a slope 52f of the truncated conical part 52b is formed such that the axial thickness t2 of the radially inner part 52 (the second annular plate part 52a and the truncated conical part 52b) is set to be larger than the axial thickness t1 of the radially outer part 51 (the first annular plate part 51a). The slope 52f is made in a straight shape in a cross-section shown in FIG. 4, for instance, in a cross-section of the truncated conical part 52b taken along a plane including the axis X.

Additionally, the axial thickness t1 of the radially outer part 51 and the axial thickness t2 of the radially inner part 52 are substantially the same at a boundary between the outer peripheral end of the truncated conical part 52b (the outer peripheral end of the second annular plate part 52a) and the inner peripheral end of the first annular plate part 51a.

As shown in FIGS. 4 and 5, the tubular mount part 52c is an axially extending part located in the center part of the second annular plate part 52a and that of the truncated conical part 52b. The tubular mount part 52c is integrated with the inner peripheral part of the second annular plate part 52a and that of the truncated conical part 52b. Additionally, the tubular mount part 52c axially extends from the truncated conical part 52b. Here, the tubular mount part 52c extends backward from the upper surface of the truncated conical part 52b.

The pinion gear 12 is coupled to the tubular mount part 52c while being unitarily rotatable therewith. When described in detail, the tubular mount part 52c includes a non-circular hole 52g extending in the axial direction. The front part of the pinion gear 12, having a non-circular cross-section, is inserted through the non-circular hole 52g of the tubular mount part 52c. Accordingly, the pinion gear 12 is locked to the tubular mount part 52c while being unitarily rotatable therewith. The nut 13 is screwed onto the tip of the pinion gear 12 under the condition, and thereby, the rotor body 7 is fixed to the pinion gear 12.

As shown in FIGS. 3 to 5, the rib parts 53 are parts extending from the radially inner part 52 toward the radially outer part 51. The rib parts 53 are on the radially inner part 52 and the radially outer part 51 while being located between the spool shaft 15 and the rotor arm member 30. The rib parts 53 are not contacted to the tubular portion 29.

Specifically, as shown in FIGS. 4 and 5, the rib parts 53 include a first rib part 54 and a second rib part 55. The first rib part 54 is integrated with the first annular plate part 51a and the truncated conical part 52b and between the spool shaft 15 and the first rotor arm 31 to be described (see FIG. 3). With that construction, a stiffness of the wall portion 50 can be enhanced. Thus, the first rib part 54 and the second rib part 55 are examples of a stiffening means. When described in detail, the first rib part 54 axially protrudes from the first annular plate part 51a and the truncated conical part 52b.

As shown in FIG. 5, the first rib part 54 radially extends between the outer peripheral part of the tubular mount part 52c and the inner peripheral part of the tubular portion 29. The first rib part 54 is not contacted to the inner peripheral part of the tubular portion 29. In other words, a gap is produced between the first rib part 54 and the inner peripheral part of the tubular portion 29. Additionally, the first rib part 54 is not contacted to the outer peripheral part of the tubular mount part 52c.

As shown in FIGS. 4 and 5, the second rib part 55 is integrated with the first annular plate part 51a and the truncated conical part 52b while being located between the spool shaft 15 and the second rotor arm 32 to be described (see FIG. 3). When described in detail, the second rib part 55 axially protrudes from the first annular plate part 51a and the truncated conical part 52b.

As shown in FIG. 5, the second rib part 55 radially extends between the outer peripheral part of the tubular mount part 52c and the inner peripheral part of the tubular portion 29. The second rib part 55 is not contacted to the inner peripheral part of the tubular portion 29. In other words, a gap is produced between the second rib part 55 and the inner peripheral part of the tubular portion 29. Additionally, the second rib part 55 is not contacted to the outer peripheral part of the tubular mount part 52c.

As shown in FIG. 3, the rotor arm member 30 is integrated with the tubular portion 29. The rotor arm member 30 includes the first rotor arm 31 and the second rotor arm 32. The first rotor arm 31 and the second rotor arm 32 forwardly extend from the rear part of the tubular portion 29.

When described in detail, the base end of the first rotor arm 31 is integrated with the rear part of the tubular portion 29. The first rotor arm 31 includes a first arm portion 31a extending from a base end of the first rotor arm 31 to a tip end of the first rotor arm 31. The first arm portion 31a is disposed away from the tubular portion 29 at an interval. The base end of the second rotor arm 32 is integrated with the rear part of the tubular portion 29, and is located in opposition to the base end of the first rotor arm 31. The second rotor arm 32 includes a second arm portion 32a extending from a base end of the second rotor arm 32 to a tip end of the second rotor arm 32. The second arm portion 32a is disposed away from the tubular portion 29 at an interval.

As shown in FIG. 3, the bail arm 44 is pivotable between a fishing-line guiding position (position shown in FIG. 2) and a fishing-line releasing position flipped over from the fishing-line guiding position. The bail arm 44 includes a first bail support member 40, a second bail support member 42, a line roller 41 and a bail 43.

The first bail support member 40 is pivotably mounted to the tip end of the first rotor arm 31. The second bail support member 42 is pivotably mounted to the tip end of the second rotor arm 32. The line roller 41 is a member for guiding the fishing line to the spool 4. The line roller 41 is rotatably mounted to the first bail support member 40.

The bail 43 couples the first bail support member 40 and the second bail support member 42, and leads the fishing line to the line roller 41. When described in detail, the bail 43 leads the fishing line to the line roller 41 when the bail arm 44 is returned to the fishing-line guiding position from the fishing-line releasing position.

Comprehensive Explanation

The aforementioned preferred embodiment can be expressed as follows.

(1) The rotor 3 of the spinning reel rotates about the spool shaft 15. The present rotor 3 preferably includes the tubular portion 29 and the wall portion 50. The tubular portion 29 is disposed away from the spool shaft 15 at a predetermined interval. The wall portion 50 includes the radially outer part 51 and the radially inner part 52. The radially outer part 51 is integrated with the inner peripheral part of the tubular portion 29. The radially inner part 52 extends from the radially outer part 51 toward the spool shaft 15. The radially outer part 51 herein has a smaller thickness than at least a part of the radially inner part 52.

In the present rotor 3, the radially outer part 51 of the wall portion 50 preferably has a smaller thickness than at least a part of the radially inner part 52 of the wall portion 50. With that construction, a formation of a sink mark can be prevented on the region at which the radially outer part 51 of the wall portion 50 is connected to the inner peripheral part of the tubular portion 29. Thus, the radially inner part 52 is an example of a preventing means for preventing a formation of a sink mark. Additionally, preventing a formation of a sink mark can prevent a concentration of stress on the region at which the radially outer part 51 of the wall portion 50 is connected to the inner peripheral part of the tubular portion 29. In other words, an aesthetic appearance of the rotor 3 can be enhanced, and simultaneously, a concentration of stress on the rotor 3 can be reduced. Moreover, the rotor 3 can be produced with a lightweight construction.

It should be noted that in the present rotor 3, the radially outer part 51 of the wall portion 50 has a smaller thickness than at least a part of the radially inner part 52 of the wall portion 50. In other words, at least a part of the radially inner part 52 of the wall portion 50 has a larger thickness than the radially outer part 51 of the wall portion 50. Accordingly, a stiff less required for the radially inner part 52 of the wall portion 50, i.e., a stiffness required for the rotor 3 can be reliably achieved, and simultaneously, the aforementioned advantageous effects can be achieved.

(2) In the rotor 3 for the spinning reel, the radially inner part 52 tapers such that a thickness thereof gradually reduces radially outward. With that construction, the radially inner part 52 and the radially outer part 51 of the wall portion 50 can be smoothly connected. In other words, a stiffness required for the wall portion 50 can be reliably achieved, and simultaneously, a concentration of stress that causes a deformation of the wall portion 50 can be avoided.

(3) In the rotor 3 for the spinning reel, the radially outer part 51 can include the first annular plate part 51a. The radially inner part 52 can include the second annular plate part 52a and the truncated conical part 52b. The second annular plate part 52a is integrated with the inner peripheral part of the first annular plate part 51a. The truncated conical part 52b axially protrudes from the second annular plate part 52a. Even with that construction, advantageous effects similar to those described above can be achieved.

(4) In the rotor 3 for the spinning reel, the truncated conical part 52b is made in a truncated shape. Hence, the radially inner part 52 and the radially outer part 51 can be smoothly connected. In other words, a stiffness required for the wall portion 50 can be reliably achieved, and simultaneously, a concentration of stress that causes a deformation of the wall portion 50 can be avoided.

(5) In the rotor 3 for the spinning reel, the wall portion 50 can further include the rib parts 53 (the first rib part 54 and the second rib part 55). The rib parts 53 extend from the radially inner part 52 to the radially outer part 51. With that construction, an increase in a weight of the wall portion 50 can be inhibited, and simultaneously, a stiffness of the wall portion 50 can be enhanced.

(6) The rotor 3 for the spinning reel can further include the rotor arm member 30 on the outer peripheral part of the tubular portion 29. The rib parts 53 are on the radially inner part 52 and the radially outer part 51 and between the spool shaft 15 and the rotor arm member 30.

In this case, the rib parts 53 are on the radially inner part 52 and the radially outer part 51 and between the spool shaft 15 and the rotor arm member 30. In other words, the rib parts 53 are on the region of the wall portion 50 to which a large magnitude of stress is transmitted from the rotor arm member 30 through the tubular portion 29. Hence, a stiffness of the wall portion 50 can be effectively enhanced.

(7) In the rotor 3 for the spinning reel, the rib parts 53 do not contact the tubular portion 29. For example, in this case, a gap is produced between the outer peripheral part of each rib part 53 and the inner peripheral part of the tubular portion 29. Hence, a stiffness of the wall portion 50 can be effectively enhanced without forming a sink mark.

(8) The spinning reel includes the spool shaft 15 and the aforementioned rotor 3 rotatable about the spool shaft 15. With that construction, the spinning reel can also achieve advantageous effects similar to those described above.

Other Preferred Embodiments (a) The aforementioned preferred embodiment has exemplified a construction in which the rib parts 53 (the first rib part 54 and the second rib part 55) radially extend. However, both or either of the first rib part 54 and the second rib part 55 might not necessarily radially extend as long as both or either of the first rib part 54 and the second rib part 55 are/is located between the spool shaft 15 and the rotor arm member 30.

(b) The aforementioned preferred embodiment has exemplified a construction in which the truncated conical part 52b protrudes backward. However, the truncated conical part 52b can protrude toward the front part of the tubular portion 29.

(c) The aforementioned preferred embodiment has exemplified that construction in which the truncated conical part 52b forms the radially outer part 51 with a smaller thickness than the radially inner part 52. However, the truncated conical part 52b can be made in a shape different from the truncated conical shape as long as the radially outer part 51 has a smaller thickness than the radially inner part 52.

(d) The aforementioned preferred embodiment has exemplified a construction in which the rib parts 53 (the first rib part 54 and the second rib part 55) protrude backward. However, both or either of the rib parts 53 (both or either of the first rib part 54 and the second rib part 55) can protrude forward.

(e) The aforementioned preferred embodiment has exemplified a construction in which the rib parts 53 (the first rib part 54 and the second rib part 55) do not contact the outer peripheral part of the tubular mount part 52c. However, both or either of the rib parts 53 (both or either of the first rib part 54 and the second rib part 55) can contact the outer peripheral part of the tubular mount part 52c.

(f) The aforementioned preferred embodiment has exemplified a construction in which the rib parts 53 include the first rib part 54 and the second rib part 55. However, the number of the rib parts 53 can instead be one, three or more than three. It should be noted that when the number of the rib parts 53 is one, it is preferred to provide the rib part 53 (the first rib part 54) on the first rotor arm 31 side in the rotor 3.

(g) The aforementioned preferred embodiment has exemplified a construction in which the slope 52f tapers in a straight shape when seen in a cross-section of the truncated conical part 52b (see FIG. 4). Instead of this construction, the slope 52f can taper in a curved shape.

(h) The aforementioned preferred embodiment has exemplified a construction in which the axial thickness t1 of the radially outer part 51 and the axial thickness t2 of the radially inner part 52 are substantially the same in the boundary between the radially inner part 52 and the radially outer part 51. However, the boundary can be formed in a stepped shape. Even with this construction, the radially outer part 51 can have a smaller thickness than the radially inner part 52.

What is claimed is:

1. A rotor for a spinning reel, the rotor configured to rotate about a spool shaft, the rotor comprising:
    a tubular portion disposed away from the spool shaft at a predetermined interval in a radial direction; and
    a plate-shaped portion including a radially outer part, a radially inner part, and a rib part extending from the radially inner part to the radially outer part, the radially outer part integrated with an inner peripheral part of the tubular portion, the radially inner part extending from the radially outer part toward the spool shaft, the rib part extending further in the radial direction than the rib part extends in a circumferential direction, the radially outer part having a smaller thickness than at least a part of the radially inner part.

2. The rotor according to claim 1, wherein the radially inner part tapers such that a thickness of the radially inner part gradually reduces in a radially outward direction.

3. The rotor according to claim 1, wherein
    the radially outer part includes a first annular plate part, and
    the radially inner part includes a second annular plate part and a protruding part, the second annular plate part integrated with an inner peripheral part of the first annular plate part, the protruding part axially protruding from the second annular plate part.

4. The rotor according to claim 3, wherein the protruding part is in a truncated shape.

5. The rotor according to claim 1, further comprising:
an arm member on an outer peripheral part of the tubular portion, wherein the rib part is on the radially inner part and the radially outer part between the spool shaft and the arm member.

6. The rotor according to claim 1, wherein the rib part does not contact the tubular portion.

7. The rotor according to claim 1, wherein a radial distance from the rib part to the spool shaft is less than a radial distance from the tubular portion to the spool shaft.

8. A spinning reel, comprising:
the spool shaft; and
the rotor recited in claim 1.

9. The rotor according to claim 1, wherein the rib part axially protrudes from the radially outer part and the radially inner part.

10. A spinning reel, comprising:
a spool shaft having an axis; and
a rotor that rotates about the axis of the spool shaft, the rotor including a tubular portion and a plate-shaped portion,
the tubular portion disposed about the spool shaft, the tubular portion including an inner peripheral part spaced apart from the spool shaft at a predetermined interval in a radial direction,
the plate-shaped portion including a radially outer part, a radially inner part, and a rib part extending radially from the radially inner part to the radially outer part, the radially outer part integrated with the inner peripheral part of the tubular portion and extending towards the radially inner part of the plate-shaped portion, the rib part extending further in the radial direction than the rib part extends in a circumferential direction,
the radially outer part having a first thickness in a direction parallel to the axis of the spool shaft, the radially inner part having a second thickness in the direction parallel to the axis of the spool shaft, the second thickness being thicker than the first thickness.

11. The spinning reel according to claim 10, wherein the radially inner part is tapered such that a thickness of the radially inner part gradually reduces in a radially outward direction.

12. The spinning reel according to claim 10, wherein
the radially outer part includes a first annular plate part having a uniform thickness in the direction parallel to the axis of the spool shaft, and
the radially inner part includes a second annular plate part and a protruding part, the second annular plate part continuously formed with the first annular plate part, the protruding part protruding from the second annular plate part in the direction parallel to the axis of the spool shaft.

13. The spinning reel according to claim 12, wherein the protruding part of the plate-shaped portion has a truncated shape.

14. The spinning reel according to claim 10, further comprising:
an arm member on an outer peripheral part of the tubular portion, wherein
the rib part is on the radially inner part of the plate-shaped portion and the radially outer part and extends radially from the spool shaft towards the arm member.

15. The spinning reel according to claim 10, wherein a radial distance from the rib part to the spool shaft is less than a radial distance from the tubular portion to the spool shaft.

* * * * *